METHOD AND APPARATUS FOR ADDRESSING A MEMORY

Filed April 12, 1963

8 Sheets-Sheet 1

INVENTORS
MAURICE HANAN
FRANK P. PALERMO
NORMAN RAVER
GEZA SCHAY

BY Bernard N. Wiener

ATTORNEY

METHOD AND APPARATUS FOR ADDRESSING A MEMORY

Filed April 12, 1963 8 Sheets-Sheet 2

United States Patent Office 3,311,888
Patented Mar. 28, 1967

3,311,888

METHOD AND APPARATUS FOR ADDRESSING A MEMORY

Maurice Hanan, Ossining, Frank P. Palermo and Norman Raver, Yorktown Heights, and Geza Schay, New York, N.Y., assignors to International Business Machines Corporation, New York, N.Y., a corporation of New York Filed Apr. 12, 1963, Ser. No. 272,802
12 Claims. (Cl. 340—172.5)

This invention relates generally to method and apparatus for addressing a memory, and it relates particularly to method and apparatus for addressing a random access memory by utilizing a key to address transformation which provides different addresses for keys within a given distance of each other.

A memory is a device for storage of information. An information record contains items of data. A random access memory has the various information storage locations therein randomly accessible. An information record is translated in a memory if it is either stored therein or retrieved therefrom. The location of an information record in a memory is termed its address. Therefore, an address is a characteristic of an information record associated with it for translation thereof in a memory.

A key is an identifier associated with an information record and characterizes it. Essentially, it is the name of the record during handling thereof external to a memory. A key to address transformation provides a unique address from a key. It is desirable to be able uniquely to associate an address with a key so that an information record accompanying the key may be translated readily in a memory. The prior art has provided certain empirical transformation techniques which are somewhat limited in application.

It is desirable to distribute the keys of a set of keys randomly in a memory. If there is clustering of keys in the set of keys, the clusters must be dispersed to obtain a random distribution. Clustering in a set of keys connotes the presence of similarities between certain keys therein, i.e., two keys have identical symbols in one or more similarly located positions.

An efficient key to address transformation does not impair the randomness already present in a set of keys and randomly disperses the clusters therein. Each cluster of keys in a set of keys includes the keys therein which are within a given distance of each other. The distance, i.e., the Hamming distance, between two keys identifies the number of symbol positions thereof in which they differ.

It is an object of this invention to provide method and apparatus for addressing a memory which provides random addresses for keys.

It is another object of this invention to provide method and apparatus for addressing a random access memory by utilizing a key to address transformation which provides different addresses for keys within a given distance of each other.

It is another object of this invention to provide method and apparatus for addressing a random access memory by utilizing an attribute of an algebraic code for a key to address transformation to break up clusters of keys.

It is another object of this invention to provide a method and apparatus for addressing a random access memory by utilizing a matrix attribute of an algebraic code for a key to address transformation to break up clusters of keys.

It is another object of this invention to provide method and apparatus for addressing a random access memory by utilizing a generator polynomial attribute of an algebraic code for a key to address transformation to break up clusters of keys.

It is another object of this invention to provide method and apparatus for addressing a random access memory by utilizing a matrix attribute of an algebraic code in which the keys are represented as $n$-tuples $(k_1, k_2 \ldots k_n)$ of symbols from an alphabet containing $2^q$ letters, where $q$ is the number of bits per symbol and the addresses are represented as $m$-tuples $(a_1 \ldots a_m)$ of symbols from the same alphabet, and the transformation $$a_i = \sum_{j=1}^{n} t_{ij} k_j$$

$(i=1, \ldots m)$, maps keys within a given Hamming distance D of each other onto different addresses in the file memory, where $[t_{ij}]$ is a matrix with $m$ rows and $n$ columns. The $a_i$, $t_{ij}$ and $k_i$ are considered as elements of a Galois field and the sum and product are evaluated as the operations of the field. As stated on page 97 of the background text "Error-Correcting Codes" by W. W. Peterson, The M.I.T. Press, 1962, the residue classes of integers modulo any prime number $p$ form a field of $p$ elements called the Galois field GF($p$). The field of polynomials over GF($p$) modulo an irreducible polynomial of degree $m$ is called the Galois field of $p^m$ elements, or GF($p^m$). Every finite field has the same structure as some Galois field and differs only in the way the elements are named.

It is another object of this invention to provide method and apparatus for file addressing utilizing a generator polynomial attribute of an algebraic code in which the keys are represented as polynomials of degree $(n-1)$ whose coefficients are symbols from an alphabet containing $2^q$ letters where $q$ is the number of bits per symbol and the addresses are represented as polynomials of degree $(m-1)$ whose coefficients are symbols from the same alphabet and the transformation $$A(X) = K(X) - Q(X)G(X)$$

maps keys within a given Hamming distance D of each other onto different addresses in the file memory, where the representation of the address A(X) is the remainder of the division of K(X), the representation of the key, by the generator polynomial of an algebraic cyclic code, and Q(X) is the quotient.

It is another object of this invention to provide method and apparatus for addressing a random access memory by utilizing a key to address transformation which distributes keys within a given distance of each other to different addresses in the memory.

It is another object of this invention to provide method and apparatus for addressing a random access memory by utilizing a key to address transformation in which the keys and addresses are represented as $n$-tuples and $m$-tuples, respectively, from an alphabet of $2^q$ elements, where $q$ is the number of bits per element.

It is another object of this invention to provide method and apparatus for addressing a random access memory by utilizing a matrix attribute of an algebraic code in which the correlation of certain linearly independent columns of the matrix determines the manner in which keys in certain clusters of keys are distributed onto addresses of the memory.

It is another object of this invention to provide method and apparatus for addressing a random access memory by utilizing a key to address transformation which does not require pre-editing of the keys and which maps a key set onto an address set as evenly as possible.

It is another object of this invention to provide method and apparatus for addressing a random access memory by utilizing a key to address transformation which has the property that the address corresponding to the sum of any given number of keys may be represented as the sum of the addresses for these keys.

The foregoing and other objects, features and advantages of the invention will be apparent from the following more particular description of preferred embodiments of the invention, as illustrated in the accompanying drawings.

In the drawings:

FIGURE 1 is a block diagram of an embodiment of the invention implementing a key to address transformation in which keys and addresses are represented as polynomials.

FIGURES 2*a*, 2*b* and 2*c*, when joined as shown in FIGURE 2 and FIGURE 3, are block diagrams illustrating portions of FIGURE 1 in greater detail.

Figure 1:
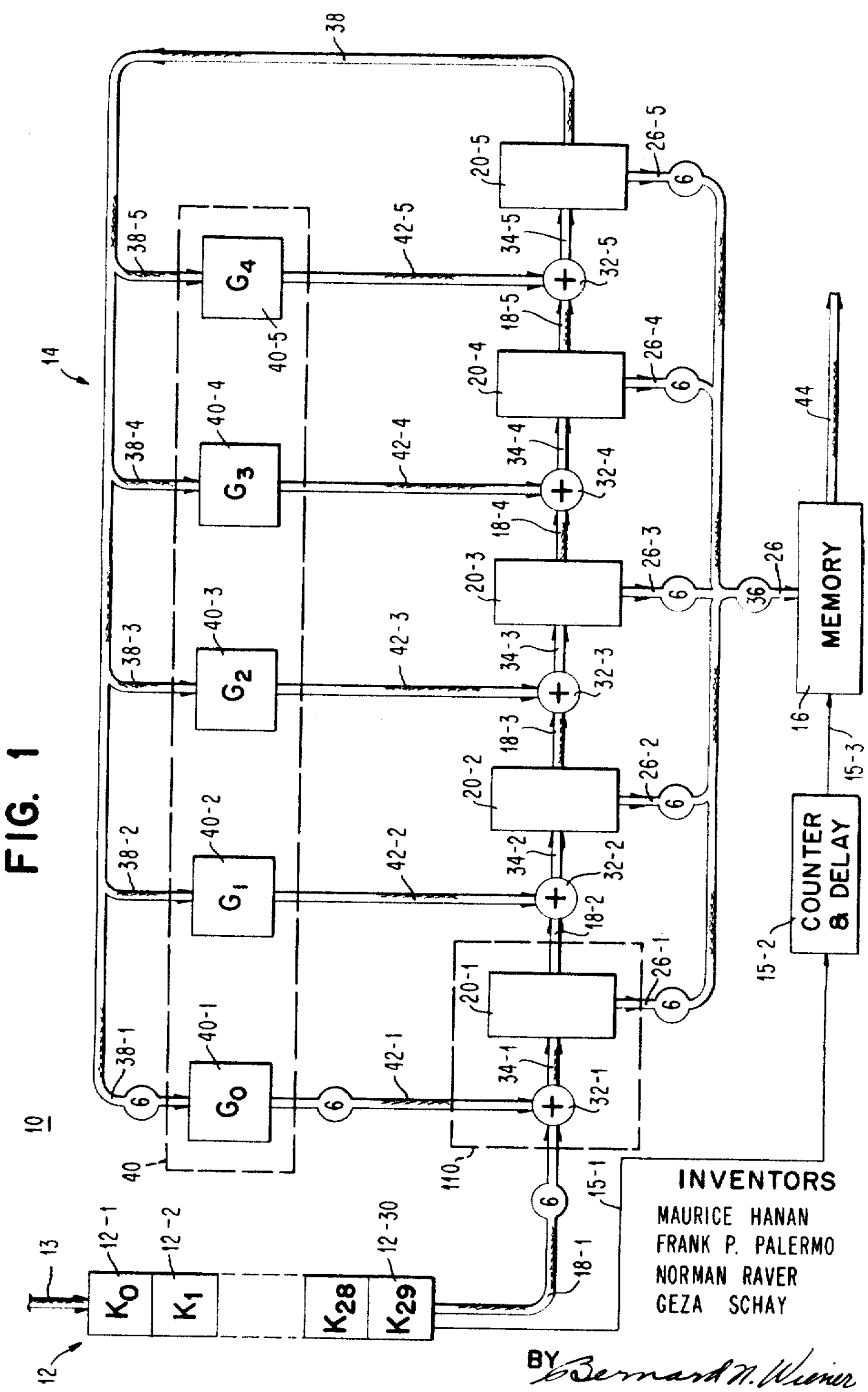

This invention provides method and apparatus for addressing a random access memory by utilizing an attribute of an algebraic code for a key to address transformation. Keys and addresses are characterized in algebraic form. A key is transformed to an address by operating on it with an attribute of the algebraic code.

One form of the invention is implemented by a unit which obtains an address $A=a_1a_2 \ldots a_m$ from a key $K=k_1k_2 \ldots k_n$ according to the transformation $$a_i=\sum_{j=1}^{n} t_{ij}k_j$$

$(i=1, 2, \ldots m)$, where $a_i$, $k_j$ and $t_{ij}$ are Galois field elements formed from an alphabet of $2^q$ symbols, $q$=number of binary bits per symbol, and $[t_{ij}]$ is a matrix attribute of an algebraic code. The unit includes logic elements for obtaining the product of two Galois field elements.

Another form of the invention is implemented by a unit which obtains the coefficients of an address from a key characterized as polynomials A(X) and K(X) of $(m-1)$ and $(n-1)$ degree, respectively, by a division operation $$K(X)=A(X)+Q(X)G(X)$$

where G(X) is a generator polynomial of an algebraic cyclic code, Q(X) is the quotient, and A(X) is the remainder.

A correlation is obtained by the practice of this invention between a key associated with an information record and an address in a random access memory. Each key is characterized in algebraic terms. The total number of allowed keys in the key set is taken to be $p^{nq}$ and the number of addresses in the address set is taken to $p^{mq}$, where $p$ is a prime number and $n$ and $m$ are integers. It is assumed that the number of keys in the memory forms a small subset of the key set at any particular time. A transformation for the practice of this invention maps the key set K onto the address set A in such a manner that any subset of the key set is mapped into the address set as evenly as possible, and keys within a Hamming distance D of each other are mapped onto different addresses. The keys are represented as $n$-tuples $(k_1 \ldots k_n)$ of symbols from an alphabet of $p^q$ letters where $q$ is the number of digits per symbol. The distance between any two keys in the key set is defined as the number of similarly located symbols by which they differ. It is desirable that the Hamming distance between keys stored at the same address be as large as possible. Alternatively, the sets K and A are regarded as $n$ and $m$ dimensional vector spaces, respectively, over the Galois field of $p^q$ elements. The weight $w(x)$ of any key vector $x$ is the number of its non-zero components, and the distance $d(x, y)$ between any two keys $x$ and $y$ equals the weight of the vector $x-y$. The practice of this invention utilizes a transformation $T:K \rightarrow A$ such that for all distinct vectors $u$ and $v$ in K, T($u$) equals T($v$) implies the distance $d(u, v)$ between $u$ and $v$ is greater than a maximum distance D. Thus, the function T separates any two keys which are not farther apart than distance D.

The distance between any two vectors is dependent upon the representation thereof. Illustratively, ABCD and ACBE are at a distance 3 from each other in any alphabet which contains A, B, C, D and E. However, if A, B, C, D and E are coded as 000, 001, 010, 011, and 100, respectively, ABCD is represented as 0000001010011 and ABCE is represented as 0000100001100, and the distance of the two keys in this representation is 7.

*Transformation*

The transformation for the practice of this invention from a key $K=(k_1 \ldots k_n)$ to an address $$A=(a_1 \ldots a_m)$$

is of the form $$a_i=\sum_{j=1}^{n} t_{ij}k_j$$

$(i=1, \ldots m)$, where $[t_{ij}]$ is a matrix with $m$ rows and $n$ columns. The distance between every pair of keys mapped onto the same address by the transformation matrix $[t_{ij}]$ is larger than D if, and only if, every D columns in the matrix are linearly independent. This implies that D is less than or equal to $m$.

A transformation matrix $[t_{ij}]$ which satisfies this requirement may be obtained as follows: Any non-zero $m$-tuple is selected as the first column of the matrix. Any non-zero $m$-tuple which is not a multiple of the first column is selected as the second column of the matrix. The third column may be any $m$-tuple that is not a linear combination of the first two columns. Generally, the $i$th column is selected as any $m$-tuple that is not a linear combination of any D–2 or less of the previous columns. Therefore, no linear combination of D–1 or less columns will be 0. Another column may be added if the set of all linear combinations of D–2 or less columns does not equal all the possible $m$-tuples.

The $[t_{ij}]$ matrix for $m=5$ and $n=30$ is

TABLE II $$\begin{matrix} t_{1-1}t_{1-2}t_{1-3} \ldots t_{1-30} \\ t_{2-1}t_{2-2}t_{2-3} \ldots t_{2-30} \\ t_{3-1}t_{3-2}t_{3-3} \ldots t_{3-30} \\ t_{4-1}t_{4-2}t_{4-3} \ldots t_{4-30} \\ t_{5-1}t_{5-2}t_{5-3} \ldots t_{5-30} \end{matrix}$$

Thus, $$a_i=\sum_{j=1}^{n=30} t_{ij}k_j$$

$(i=1, 2, \ldots m=5)$, develops as $$\begin{aligned} a_1&=t_{11}k_1+t_{12}k_2+t_{13}k_3+ \ldots t_{1-30}k_{30} \\ a_2&=t_{21}k_1+t_{22}k_2+t_{23}k_3+ \ldots t_{2-30}k_{30} \\ a_3&=t_{31}k_1+t_{32}k_2+t_{33}k_3+ \ldots t_{3-30}k_{30} \\ a_4&=t_{41}k_1+t_{42}k_2+t_{43}k_3+ \ldots t_{4-30}k_{30} \\ a_5&=t_{51}k_1+t_{52}k_2+t_{53}k_3+ \ldots t_{5-30}k_{30} \end{aligned}$$

An equivalent representation of the transformation is obtained when the keys and addreses are written in polynomial form as $$K(x)=\sum_{i=1}^{n} k_i x^{i-1}$$

and $$A(x)=\sum_{i=1}^{m} a_i x^{i-1}$$

$A(x)$ is obtained from $K(x)$ by the division operation $$\frac{K(x)}{G(x)}=Q(x)+\frac{A(x)}{G(x)}$$

where $G(x)$ is the quotient, and $A(x)$ is the remainder. In the art of error-correcting codes, the remainder $A(x)$ is termed the error-characteristic or syndrome. A background text which describes algebraic codes is "Error-Correcting Codes" by W. W. Peterson, The M. I. T. Press, 1962. A suitable generator polynomial for the practice of the invention is obtained by adopting the particular Bose-Chaudhuri formulation described on page 162 et. seq. If $\alpha$ is a primtive element of the Galois field GF($s$), (i.e., $\alpha^{s-1}=1$ and $\alpha^{i}\neq 1$ for $0<i<s-1$), then the code generated by the polynomial $$G(x)=(x-\alpha)(x-\alpha^2)\ .\ .\ .\ (x-\alpha^{d-1})=\sum_{i=0}^{d-1} g_i x^i$$

has minimum distance $d$ in a code of length less than $s$ and is a suitable generator polynomial for the practice of the invention. In accordance with the Bose-Chaudhuri theorem, if $n\leq s-1$, then the minimum distance between two keys providing the same $A(x)$ is at least $d$. Other generator polynomials for special cyclic codes are described in the noted text and may be used for the transformation in the practice of this invention. Illustratively, the generator polynomial for a fire code may be used for breaking up clusters of bits.

The embodiments described herein have been designed to transform keys formed from an alphabet $s=2^6=64$ Galois field elements to respective addresses. The other parameters are $n=30$, $m=5$ and $q=6$. Thus, the number of keys in the set K is $2^{180}$ and the number of addresses in the set A is $2^{30}$. The 64 symbols are written as the 64 possible 6-tuples using the symbols 0 and 1. The sum of two elements ($e_1$, $e_2$, $e_3$, $e_4$, $e_5$, $e_6$) and ($f_1$, $f_2$, $f_3$, $f_4$, $f_5$, $f_6$) is ($e_1+f_1$, $e_2+f_2$, $e_3+f_3$, $e_4+f_4$, $e_5+f_5$, $e_6+f_6$), where the sum $e_1+f_1$ is taken modulo 2, i.e., $0+0=1+1=0$ and $0+1=1+0=1$. The elements of the field form a cyclic group under multiplication, i.e., each element is a power of one element in the group. The following assignments are made $$0\ 0\ 0\ 0\ 0\ 0=0$$
$$1\ 0\ 0\ 0\ 0\ 0=1$$
$$0\ 1\ 0\ 0\ 0\ 0=\alpha$$

$$0\ 0\ 1\ 0\ 0\ 0=\alpha^2$$
$$0\ 0\ 0\ 1\ 0\ 0=\alpha^3$$
$$0\ 0\ 0\ 0\ 1\ 0=\alpha^4$$
$$0\ 0\ 0\ 0\ 0\ 1=\alpha^5$$

and the higher powers of $\alpha$ are obtained by reducing them with the aid of the equation, $\alpha^6=\alpha+1$. Hence, $$\alpha^{n}=\alpha^{n\pm 63k}$$

for integers $n$ and $k$. Thus, $$1\ 1\ 0\ 0\ 0\ 0=\alpha^6$$
$$0\ 1\ 1\ 0\ 0\ 0=\alpha^7$$

etc.

Table I is a tabulation of the elements of the GF($2^6$) field in terms of powers of $\alpha$. In a practical circumstance, alpha-numeric symbols are arbitrarily assigned to the field elements. A key is a sequence of alpha-numeric symbols, and by the noted assignment is formulated as a sequence of field elements.

TABLE I.—TABLE OF GF($2^6$) ELEMENTS

| 0 element=000000 | | | | | | | $\alpha^0=1=100000$ | | | | | | |
|---|---|---|---|---|---|---|---|---|---|---|---|---|---|
| $n$ | Low | | | High | | | $n$ | Low | | | High | | |
| 0 | 1 | 0 | 0 | 0 | 0 | 0 | 32 | 1 | 0 | 0 | 1 | 0 | 0 |
| 1 | 0 | 1 | 0 | 0 | 0 | 0 | 33 | 0 | 1 | 0 | 0 | 1 | 0 |
| 2 | 0 | 0 | 1 | 0 | 0 | 0 | 34 | 0 | 0 | 1 | 0 | 0 | 1 |
| 3 | 0 | 0 | 0 | 1 | 0 | 0 | 35 | 1 | 1 | 0 | 1 | 0 | 0 |
| 4 | 0 | 0 | 0 | 0 | 1 | 0 | 36 | 0 | 1 | 1 | 0 | 1 | 0 |
| 5 | 0 | 0 | 0 | 0 | 0 | 1 | 37 | 0 | 0 | 1 | 1 | 0 | 1 |
| 6 | 1 | 1 | 0 | 0 | 0 | 0 | 38 | 1 | 1 | 0 | 1 | 1 | 0 |
| 7 | 0 | 1 | 1 | 0 | 0 | 0 | 39 | 0 | 1 | 1 | 0 | 1 | 1 |
| 8 | 0 | 0 | 1 | 1 | 0 | 0 | 40 | 1 | 1 | 1 | 1 | 0 | 1 |
| 9 | 0 | 0 | 0 | 1 | 1 | 0 | 41 | 1 | 0 | 1 | 1 | 1 | 0 |
| 10 | 0 | 0 | 0 | 0 | 1 | 1 | 42 | 0 | 1 | 0 | 1 | 1 | 1 |
| 11 | 1 | 1 | 0 | 0 | 0 | 1 | 43 | 1 | 1 | 1 | 0 | 1 | 1 |
| 12 | 1 | 0 | 1 | 0 | 0 | 0 | 44 | 1 | 0 | 1 | 1 | 0 | 1 |
| 13 | 0 | 1 | 0 | 1 | 0 | 0 | 45 | 1 | 0 | 0 | 1 | 1 | 0 |
| 14 | 0 | 0 | 1 | 0 | 1 | 0 | 46 | 0 | 1 | 0 | 0 | 1 | 1 |
| 15 | 0 | 0 | 0 | 1 | 0 | 1 | 47 | 1 | 1 | 1 | 0 | 0 | 1 |
| 16 | 1 | 1 | 0 | 0 | 1 | 0 | 48 | 1 | 0 | 1 | 1 | 0 | 0 |
| 17 | 0 | 1 | 1 | 0 | 0 | 1 | 49 | 0 | 1 | 0 | 1 | 1 | 0 |
| 18 | 1 | 1 | 1 | 1 | 0 | 0 | 50 | 0 | 0 | 1 | 0 | 1 | 1 |
| 19 | 0 | 1 | 1 | 1 | 1 | 0 | 51 | 1 | 1 | 0 | 1 | 0 | 1 |
| 20 | 0 | 0 | 1 | 1 | 1 | 1 | 52 | 1 | 0 | 1 | 0 | 1 | 0 |
| 21 | 1 | 1 | 0 | 1 | 1 | 1 | 53 | 0 | 1 | 0 | 1 | 0 | 1 |
| 22 | 1 | 0 | 1 | 0 | 1 | 1 | 54 | 1 | 1 | 1 | 0 | 1 | 0 |
| 23 | 1 | 0 | 0 | 1 | 0 | 1 | 55 | 0 | 1 | 1 | 1 | 0 | 1 |
| 24 | 1 | 0 | 0 | 0 | 1 | 0 | 56 | 1 | 1 | 1 | 1 | 1 | 0 |
| 25 | 0 | 1 | 0 | 0 | 0 | 1 | 57 | 0 | 1 | 1 | 1 | 1 | 1 |
| 26 | 1 | 1 | 1 | 0 | 0 | 0 | 58 | 1 | 1 | 1 | 1 | 1 | 1 |
| 27 | 0 | 1 | 1 | 1 | 0 | 0 | 59 | 1 | 0 | 1 | 1 | 1 | 1 |
| 28 | 0 | 0 | 1 | 1 | 1 | 0 | 60 | 1 | 0 | 0 | 1 | 1 | 1 |
| 29 | 0 | 0 | 0 | 1 | 1 | 1 | 61 | 1 | 0 | 0 | 0 | 1 | 1 |
| 30 | 1 | 1 | 0 | 0 | 1 | 1 | 62 | 1 | 0 | 0 | 0 | 0 | 1 |
| 31 | 1 | 0 | 1 | 0 | 0 | 1 | 63 | 1 | 0 | 0 | 0 | 0 | 0 |

The following expansion provides the respective terms for the multiplication of any two elements $\alpha^x$ and $\alpha^z$ in a Galois field GF($2^6$).

$$\alpha^x\alpha^z=(b_0+b_1\alpha+b_2\alpha^2+b_3\alpha^3+b_4\alpha^4+b_5\alpha^5)\\(c_0+c_1\alpha+c_2\alpha^2+c_3\alpha^3+c_4\alpha^4+c_5\alpha^5)$$

The product may be reduced to $$\alpha^x\alpha^z=d_0+d_1\alpha^1+d_2\alpha^2+d_3\alpha^3+d_4\alpha^4+d_5\alpha^5$$

where $$d_0=[b_0c_0+b_5c_1+b_4c_2+b_3c_3+b_2c_4+b_1c_5]$$
$$d_1=[b_1c_0+b_0c_1+b_5c_1+b_4c_2+b_3c_3+b_2c_4\\+b_1c_5+b_5c_2+b_4c_3+b_3c_4+b_2c_5]$$
$$d_2=[b_2c_0+b_1c_1+b_0c_2+b_5c_2+b_4c_3\\+b_3c_4+b_2c_5+b_5c_3+b_4c_4+b_3c_5]$$
$$d_3=[b_3c_0+b_2c_1+b_1c_2+b_0c_3+b_5c_3\\+b_4c_4+b_3c_5+b_5c_4+b_4c_5]$$
$$d_4=[b_4c_0+b_3c_1+b_2c_2+b_1c_3+b_0c_4+b_5c_4+b_4c_5+b_5c_5]$$
$$d_5=[b_5c_0+b_4c_1+b_3c_2+b_2c_3+b_1c_4+b_0c_5+b_5c_5]$$

A generator polynomial in accordance with the noted Bose-Chaudhuri theorem is:

$$G(X)=\alpha^{15}+\alpha^{3}X+\alpha^{11}X^2+\alpha^{8}X^3+\alpha^{57}X^4+\alpha^{0}X^5\\=g_0+g_1X+g_2X^2+g_3X^3+g_4X^4+X^5$$

Therefore, $g_0=000101 \quad (b_3=b_5=1,\ b_0=b_1=b_4=0)$
$g_1=000100 \quad (b_2=1,\ b_0=b_1=b_3=b_4=b_5=0)$
$g_2=110001 \quad (b_1=b_0=b_5=1,\ b_4=b_2=b_3=0)$
$g_3=001100 \quad (b_2=b_5=1,\ b_0=b_4=b_5=0)$
$g_4=011111 \quad (b_0=0, b_1=b_2=b_3=b_4=b_5)$
$g_5=100000 \quad (b_0=1,\ b_1=b_2=b_3=b_4=b_5=0)$ Accordingly, the expressions for $d_0, \ldots d_5$ reduce to the following tabulations for the $G_0, \ldots, G_5$ multiplier units of FIG. 1.

(1) $G_0{:}g_0=\alpha^{15},\ b_3=b_5=1,\ b_0=b_1=b_2=b_4=0$
$d_0=c_3+c_1$
$d_1=c_1+c_3+c_2+c_4$
$d_2=c_2+c_4+c_3+c_5$
$d_3=c_0+c_3+c_5+c_4$
$d_4=c_1+c_4+c_5$
$d_5=c_0+c_2+c_5$ (2) $G_1{:}g_1=\alpha^3,\ b_2=1,\ b_0=b_1=b_3=b_4=b_5=0$
$d_0=c_4$
$d_1=c_4+c_5$
$d_2=c_0+c_5$
$d_3=c_1$
$d_4=c_2$
$d_5=c_3$ (3) $G_2{:}g_2=\alpha^{11},\ b_1=b_0=b_5=1,\ b_4=b_2=b_3=0$
$d_0=c_1+c_0+c_5$
$d_1=c_0+c_2+c_5$
$d_2=c_1+c_3$
$d_3=c_2+c_4$
$d_4=c_5+c_3$
$d_5=c_0+c_4$ (4) $G_3{:}g_3=\alpha^8,\ b_2=b_3=1,\ b_0=b_1=b_4=b_5=0$
$d_0=c_3+c_4$
$d_1=c_3$
$d_2=c_0+c_4$
$d_3=c_1+c_5$
$d_4=c_1+c_2$
$d_5=c_2+c_3$ (5) $G_4{:}g_4=\alpha^{57},\ b_0=0,\ b_1=b_2=b_3=b_4=b_5$
$d_0=c_1+c_2+c_3+c_4+c_5$
$d_1=c_0+c_1$
$d_2=c_0+c_1+c_2$
$d_3=c_0+c_1+c_2+c_3$
$d_4=c_0+c_1+c_2+c_3+c_4$
$d_5=c_0+c_1+c_2+c_3+c_4+c_5$ (6) $G_5{:}g_5=\alpha^0,\ b_0=b_0=1,\ b_1+b_2+b_3+b_4+b_5=0$
$d_0=c_0$
$d_1=c_1$
$d_2=c_2$
$d_3=c_3$
$d_4=c_4$
$d_5=c_5$ The practice of this invention will be described with reference to the embodiment 10 thereof presented in FIG. 1. Generally, it comprises an input shift register 12 in which are established the Galois field components $k_{29}$, $k_{28}, \ldots, k_0$ of an input key K; a transformation unit 14 to which each key K is applied to obtain therefrom a related address A; and a memory unit 16 to be addressed by unit 14. The components $k_{29}, k_{28}, \ldots, k_0$ in shift register 12 are sequentially introduced to transformation unit 14 via cable 18–1. After the operation of transformation unit 14 on a key K, an address A having components $a_0, a_1, \ldots a_4$ is in shift register cells 20–1, 20–2, . . . 20–5, respectively. The address A is applied therefrom via cable 26 to memory 16 to designate the requisite memory location therein.

In greater detail, shift register 12 has shift register cells 12–1 to 12–30, in which the components of a key K are introduced via cable 13. Transformation unit 14 has modulo-2 adder units 32–1 to 32–5 which are connected to shift register cells 20–1 to 20–5 by cables 34–1 to 34–5, respectively. Cable 18–1 from shift register 12 is connected to modulo-2 adder unit 32–1 and storage cells 20–1 to 20–4 are connected via cables 18–2 to 18–5 to modulo-2 adder units 32–2 to 32–5, respectively. Cable 38 is connected between storage cell 20–5 and multiplier section 40. Multiplier 40 comprises multiplier units 40–1 to 40–5 which corresponds to $G_0$ to $G_4$ characterized above for the product of two Galois field elements. Branch cables 38–1 to 38–5, respectively, connect cable 38 thereto. Multiplier units 40–1 to 40–5 are connected via cables 42–1 to 42–5 to modulo-2 adder units 32–1 to 32–5, respectively. Branch cables 26–1 to 26–2 connect storage cells 20–1 to 20–5, respectively, to memory 16. Cell 12–30 of shift register 12 applies a pulse via line 15–1 to counter and delay unit 15–2 for each element $k_1$ applied therefrom to cable 18–1. Counter and delay unit 15–2 applies a pulse via line 15–3 to memory 16 to enable it to be addressed by transformation unit 14. The output from memory 16 is supplied externally therefrom via cable 44.

Figures 2, 2A:
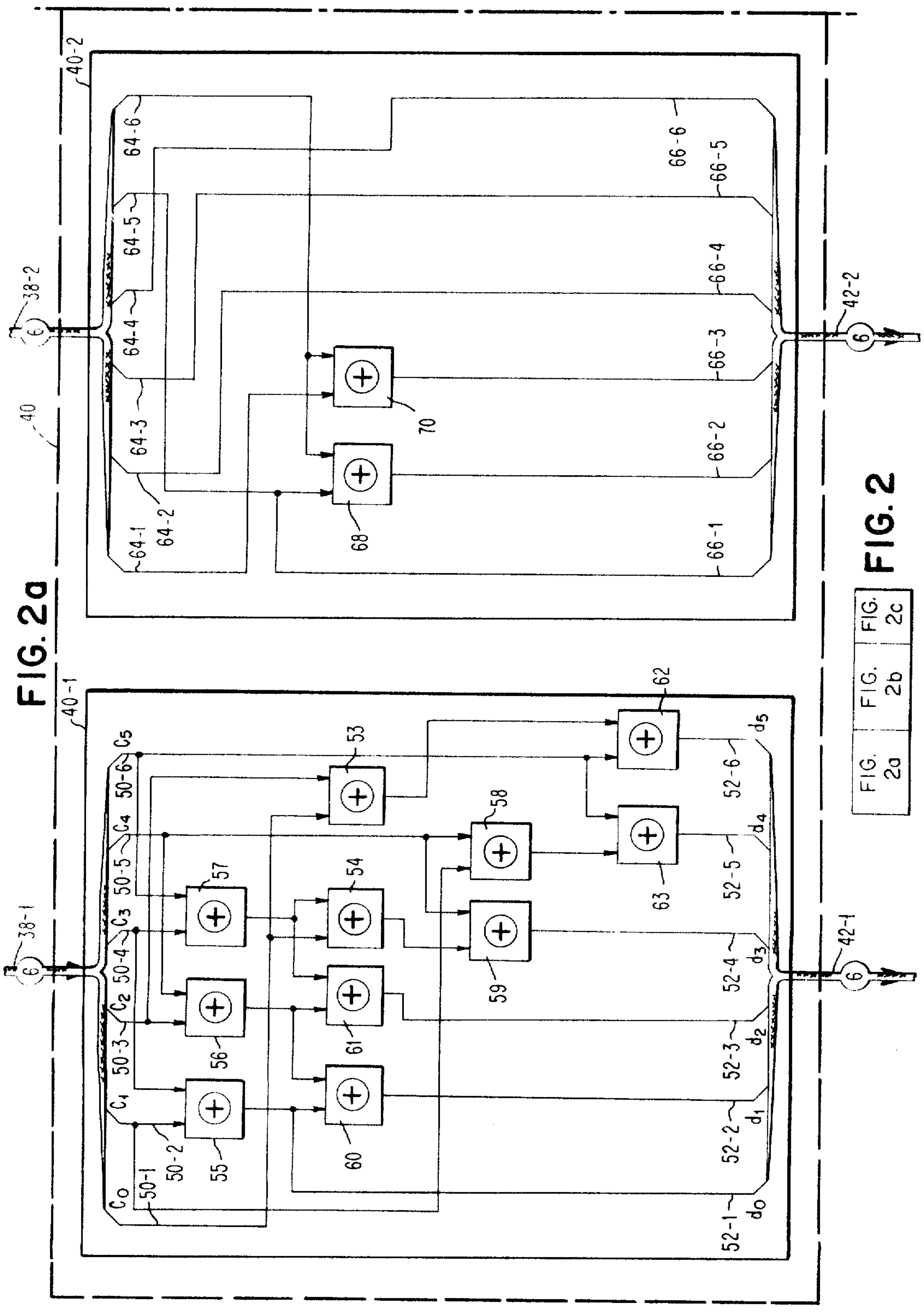
Figure 2B:
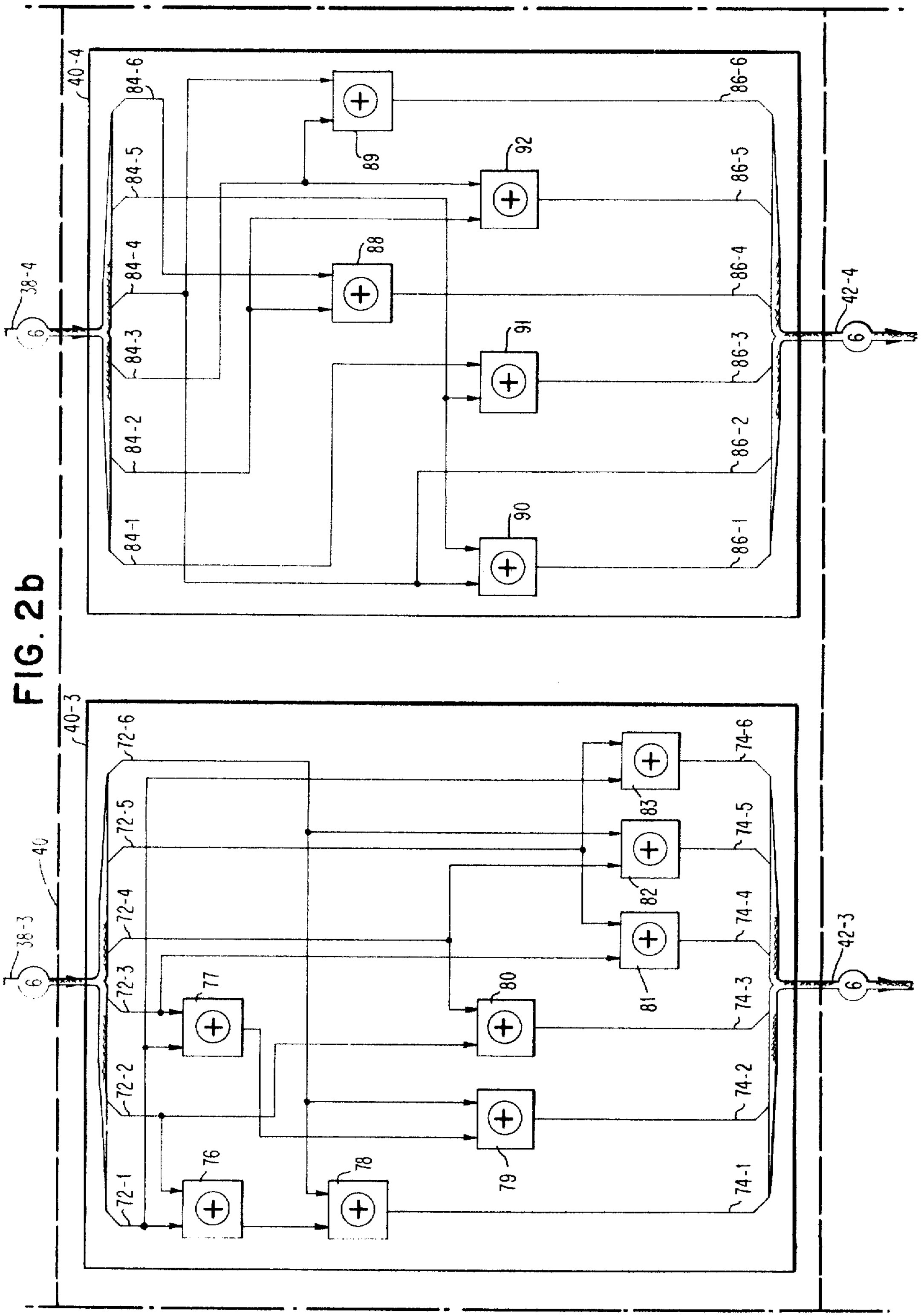

Multiplier 40 is shown in greater detail in FIG. 2. Input lines 50–1 to 50–6, 64–1 to 64–6, 72–1 to 72–6, 84–1 to 84–6 and 94–1 to 94–6 are in parallel, respectively. Output lines 52–1 to 52–6, 66–1 to 66–6, 74–1 to 74–6, 86–1 to 86–6 and 98–1 to 98–6 are in parallel, respectively. The input lines from left to right for each multiplier unit correspond to $c_0$ to $c_5$ characterized above. The output lines from left to right for each multiplier unit correspond to $d_0$ to $d_5$ characterized above. Multiplier unit 40–1 has input lines 50–1 to 50–6 of cable 38–1 and output lines 52–1 to 52–6 of cable 42–1. Input line 50–1 is connected to modulo-2 adder units 53 and 54. Input line 50–2 is connected to modulo-2 adder units 55 and 58. Input line 50–3 is connected to modulo-2 adder units 53 and 56. Input line 50–4 is connected to modulo-2 adder units 55 and 57. The output of modulo-2 adder unit 55 is connected to the input of modulo-2 adder unit 60 and to output line 52–1. The output of modulo-2 adder unit 56 is connected to the inputs of modulo-2 adder units 60 and 61. The output of modulo-2 adder unit 57 is connected to the inputs of modulo-2 adder units 54 and 61. The output lines 52–2 and 52–3 are connected to the outputs of modulo-2 adder units 60 and 61, respectively. Input line 50–5 is connected to the inputs of modulo-2 adder units 56, 58 and 59. Input line 50–6 is connected to the inputs of modulo-2 adder units 57, 62 and 63. The output line 52–4 is connected to the output of modulo-2 adder unit 59. The output of modulo-2 adder 53 and 54 is connected to the input of modulo-2 adders 62 and 59, respectively. The output of modulo-2 adder unit 58 is connected to the input of modulo-2 adder unit 63. Output lines 52–5 and 52–6 are connected to the outputs of modulo-2 adder units 63 and 62, respectively.

Multiplier unit 40–2 includes input lines 64–1 to 64–5 of cable 38–2 and output lines 66–1 to 66–6 of cable 42–2, and modulo-2 adder units 68 and 70. Input line 64–1 is connected to the input of modulo-2 adder unit 70. Input lines 64–2, 64–3 and 64–4 are connected to output lines 66–4 and 66–6, respectively. Input line 64–4 is connected to the inputs of modulo-2 adder units 68 and 70. Input line 64–5 is connected to the input of modulo-2 adder unit 68 and to output line 66–1. The outputs of modulo-2 adders 68 and 70 are connected to the output lines 66–2 and 66–3, respectively.

Multiplier unit 40–3 comprises input lines 72–1 to 72–6; output lines 74–1 to 74–6; and modulo-2 adder units 76 to 83. Input line 72–1 is connected to the inputs of modulo-2 adder units 76, 77 and 83. Input line 72–2 is connected to the inputs of modulo-2 adder units 76 and 80. Input line 72–3 is connected to the inputs of modulo-2 adder units 77 and 81. Input line 72–4 is connected to the inputs of modulo-2 adder units 80 and 82. Input line 72–5 is connected to the inputs of modulo-2 adder units 81 and 83. Input line 72–6 is connected to the inputs of modulo-2 adder units 78, 79 and 82. The output of modulo-2 adder unit 76 is connected to the input of modulo-2 adder unit 78; the output of modulo-2 adder unit 77 is connected to the input of modulo-2 adder unit 79. The outputs of modulo-2 adder units 79 and 80 are connected to output lines 74–2 and 74–3. The outputs of modulo-2 adder units 81 to 83 are connected to output lines 74–4 to 74–6, respectively. The output of modulo-2 adder is connected to output line 74–1.

Multiplier unit 40–4 comprises input lines 84–1 to 84–6; output lines 86–1 to 86–6; and modulo-2 adder units 88 to 92. Input line 84–1 is connected to the input of modulo-2 adder unit 91. The input line 84–2 is connected to the inputs of modulo-2 adder units 88 and 92. Input line 84–3 is connected to the inputs of modulo-2 adder units 89 and 92. Input line 84–4 is connected to the inputs of modulo-2 adder units 89 and 90 and output line 86–2. Input line 84–5 is connected to the inputs of modulo-2 adder units 90 and 91. Input line 84–6 is connected to the input of modulo-2 adder unit 88. The outputs of modulo-2 adder units 90, 91 and 92 are connected to output lines 86–1, 86–3 and 86–5 respectively. The outputs of modulo-2 adder units 88 and 89 are connected to output lines 86–4 and 86–6, respectively.

Multiplier unit 40–5 comprises input lines 94–1 to 96–6; output lines 98–1 to 98–6; and modulo-2 adder units 100 to 109. Input line 94–1 is connected to the input of modulo-2 adder unit 100. Input line 94–2 is connected to the input of modulo-2 adder units 100 and 101. Input line 94–3 is connected to the inputs of modulo-2 adder units 101, 102 and 104. Input line 94–4 is connected to the inputs of modulo-2 adder units 102 and 106. Input line 94–5 is connected to the inputs of modulo-2 adder units 102 and 107. Input line 94–6 is connected to the input of modulo-2 adder unit 103. The output of modulo-2 adder unit 100 is connected to output line 98–2 and to the inputs of modulo-2 adder units 104 and 105. The output of modulo-2 adder unit 101 is connected to the input of modulo-2 adder 106. The output of modulo-2 adder unit 102 is connected to the input of modulo-2 adder unit 105. The output of modulo-2 adder unit 103 is connected to the inputs of modulo-2 adder units 108 and 109. The output of modulo-2 adder unit 104 is connected to output line 98–103. The output of modulo-2 adder unit 105 is connected to the input of modulo-2 adder units 107 and 109 and output line 98–4. The output of modulo-2 adder unit 106 is connected to the input of modulo-2 adder unit 108. The output of modulo-2 adder unit 107 is connected to output line 98–5. The outputs of modulo-2 adder units 108 and 109 are connected to output lines 98–1 and 98–6, respectively.

Figure 3:
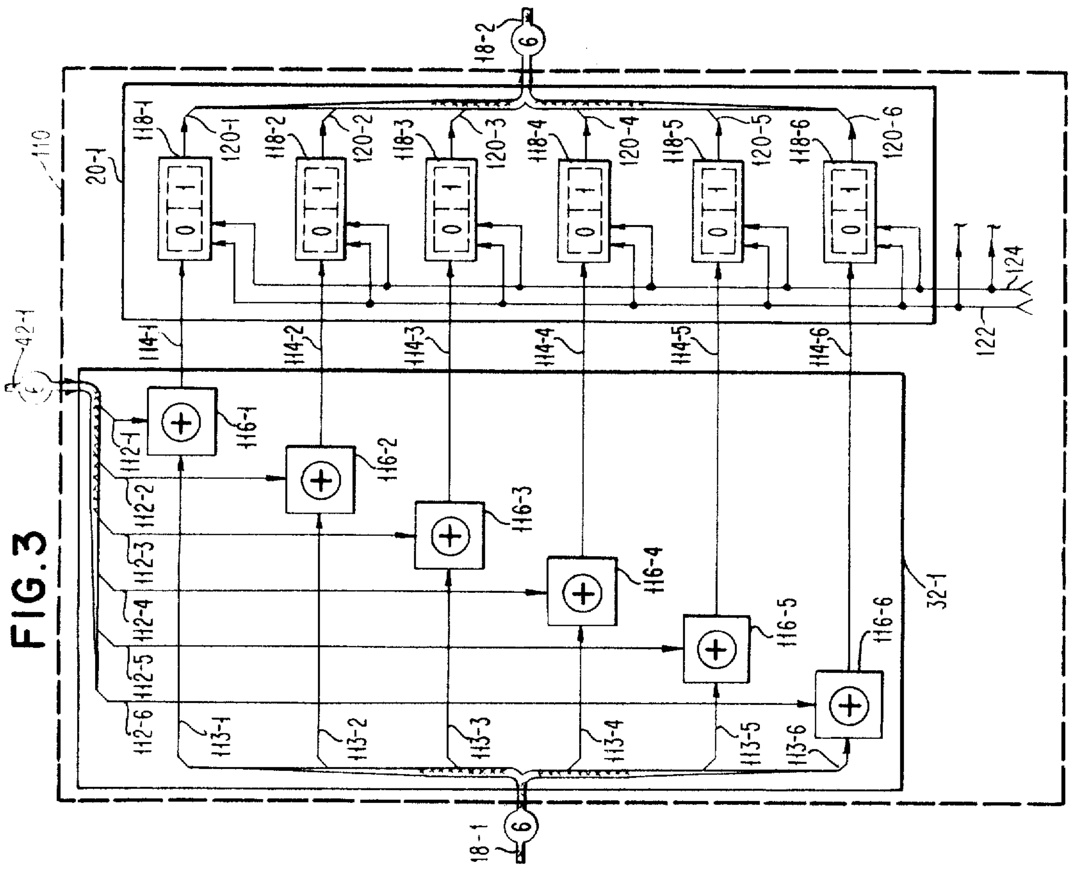
Figure 2C:
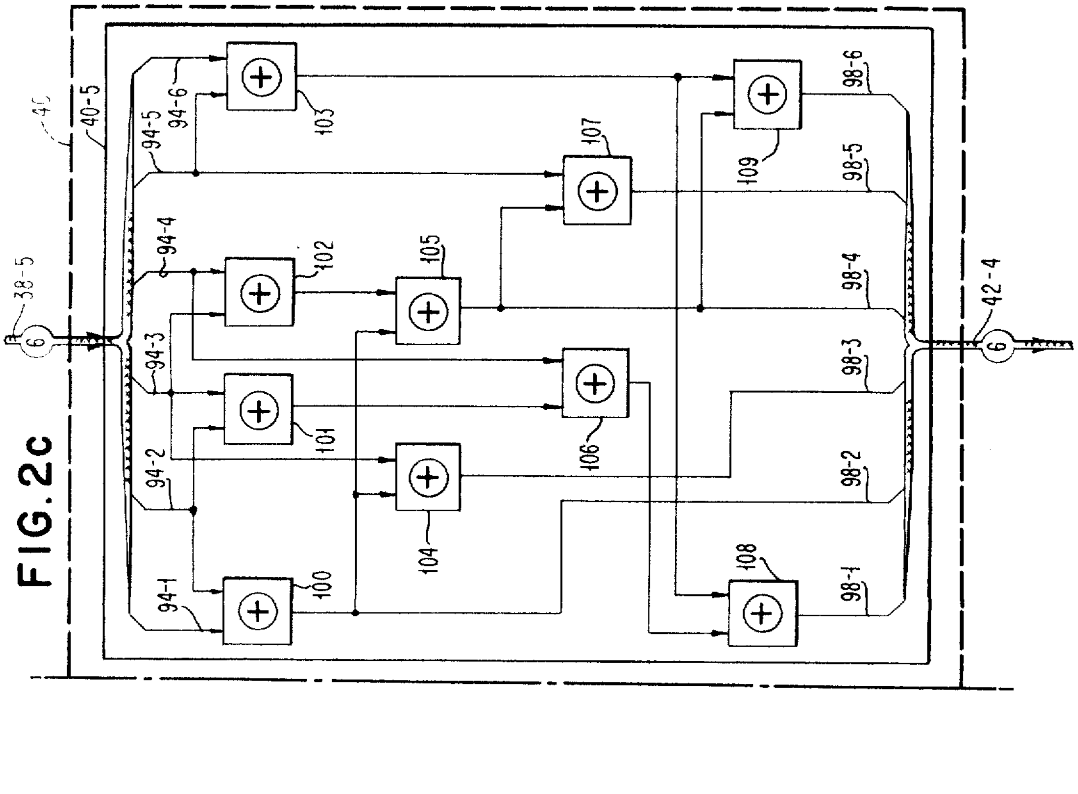

The unit 110 of transformation unit 14 of FIG. 1 which includes modulo-2 adder 32–1 and storage cell 20–1 is shown in greater detail in FIG. 3. The units comprised of modulo-2 adders 32–2 to 32–5 with storage cells 20–2 to 20–5, respectively, are similar to the unit 110. Modulo-2 adder 32–1 comprises input lines 112–1 to 112–6 of cable 42–1; input lines 113–1 to 113–6 of input cable 18–1; output lines 114–1 to 114–6 of cable 34–1; and modulo-2 adder units 116–1 to 116–6. Input lines 112–1 to 112–6 and 113–1 to 113–6 are connected to the inputs of modulo-2 adders 116–1 to 116–6, respectively. The outputs of modulo-2 adders 116–1 to 116–6 are connected via output lines 114–1 to 114–6 to the inputs of flip-flops 118–1 to 118–6, respectively, of storage cell 20–1. The outputs of flip-flops 118–1 to 118–6 are connected to lines 120–1 to 120–6 of cable 18–2. Shift timing lines 122 and 124 are connected to flip-flops 118–1 to 118–6. Timing line 122 is used to reset flip-flops 118–1 to 118–6 and timing line 124 is used to present the stored values of the flip-flops to their output lines 120–1 to 120–2, respectively, of cable 18–2.

Figure 4:
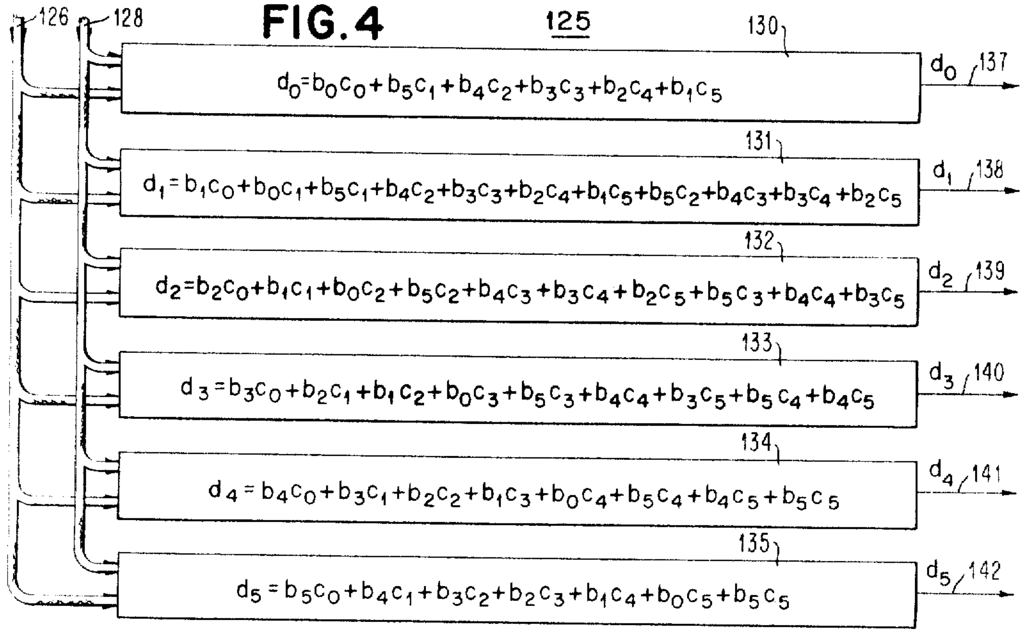
FIGURE 4 is a general multiplier unit suitable for the embodiment of FIGURE 1.

FIG. 4 illustrates a generalized multiplier unit 125 suitable for each multiplier unit 40–1 to 40–5 of FIG. 1. It comprises input cables 126 and 128 connected to logic units 130 to 135. The outputs of logic units 130–135 are connected to output lines 137 to 142. The input cable 126 corresponds to one of the cables 38–1 to 38–5 of FIG. 1. The cable 128 does not appear in FIG. 1 because it is internal to the multiplier units 40–1 to 40–5. For the general multiplication of two Galois field elements in $GF(2^6)$, the appropriate values $b_0$ to $b_5$ are introduced to lines 128–1 to 128–6, respectively, from storage registers, not shown, in accordance with the values tabulated above for the multiplier units $G_0$ to $G_5$. The output lines 137 to 142 constitute a cable which corresponds to the respective one of the cables 42–1 to 42–5. The values for $b_0$ to $b_5$ are established on lines 128–1 to 128–6 (FIGS. 5 and 6), respectively, of cable 128. The values for $c_0$ to $c_5$ are established on lines 126–1 to 126–5, respectively. The values for $d_0$ to $d_5$ are provided on lines 137 to 142, respectively. The relationships between the $b$ values, the $c$ values and the $d$ values have been set forth above when the product of two Galois field elements in $GF(2^6)$ was expanded. The expressions for $d_0$ to $d_5$ are indicated on logic units 130 to 135, respectively. The product of two terms, e.g., $b_0$ and $c_0$ is obtained by an AND unit. The sum of two terms, e.g., $b_0c_0+b_5c_1$, is obtained by a modulo-2 adder unit.

Figure 5:
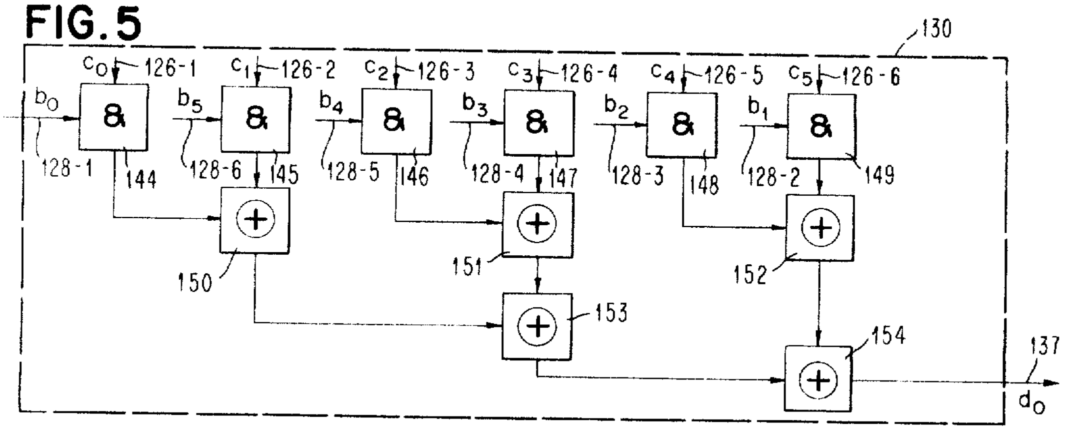
FIGURES 5 and 6 illustrate portions of FIGURE 4 in greater detail.
Figure 6:
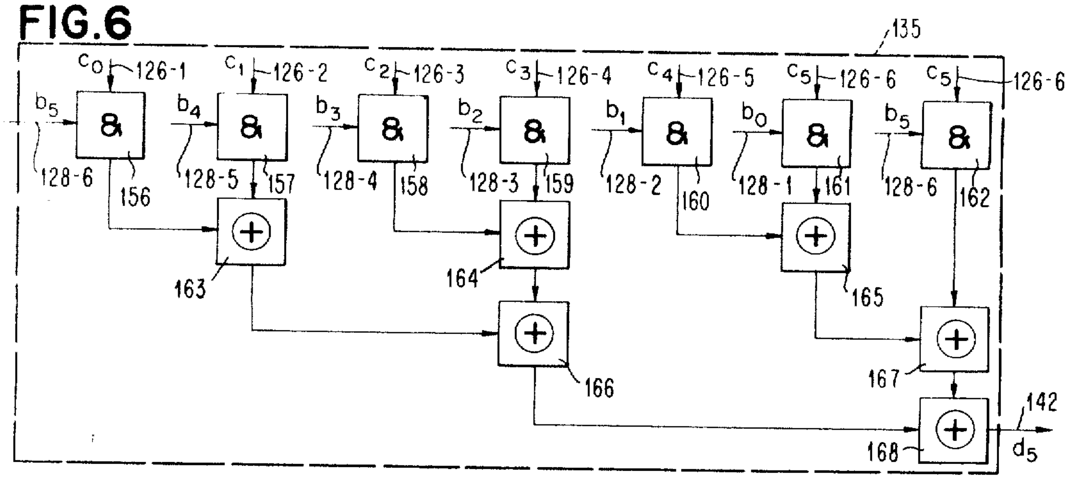

Logic units 130 and 135 are shown in greater detail in FIGS. 5 and 6, respectively. The detailed logic for logic units 131 to 134 is obtained similarly. Logic unit 130 includes input lines 126–1 to 126–6 of cable 126 and input lines 128–1 to 128–6 of cable 128. Logic unit 130 also includes AND units 144 to 149 and modulo-2 adder units 150 to 154. The output from logic unit 130 is provided on output line 137. Input lines 126–1 to 126–6 are connected to the inputs of AND units 144 to 149, respectively. Input lines 128–1, 128–6, 128–5, 128–4, 128–3 and 128–2 are connected to AND units 144 to 149, respectively. The outputs of AND units 144 and 145 are connected to the input of modulo-2 adder 150; the outputs of AND units 146 and 147 are connected to the input of modulo-2 adder 151; and the outputs of AND units 148 and 149 are connected to the input of modulo-2 adder 152. The outputs of modulo-2 adders 150 and 151 are connected to the input of modulo-2 adder 153; and the outputs of modulo-2 adders 152 and 153 are connected to the input of modulo-2 adder 154.

Logic unit 135 includes input lines 126–1 to 126–6 of cable 126 and input lines 128–1 to 128–6 of cable 128; AND units 156 to 162; and modulo-2 adder units 163 to 168. The same $b$ and $c$ values are applied to units 130 to 135. Input lines 126–1 to 126–5 are connected to the inputs of AND units 156 to 160, respectively. Input line 126–6 is connected to the inputs of AND units 161 and 162. Input lines 128–6′, 128–5′, 128–4′, 128–3′, 128–2′, and 128–1′ are connected to the inputs of AND units 156 to 161, respectively. Input line 128–6 is also connected to the input of AND unit 162. The outputs of AND units 156 and 157 are connected to the input of modulo-2 adder 163; the outputs of AND units 158 and 159 are connected to the input of modulo-2 adder unit 164; the outputs of AND units 160 and 161 are connected to the input of modulo-2 adder unit 158; the output of AND unit 162 is connected to the input of modulo-2 adder 167. The outputs of modulo-2 adders 163 and 164 are connected to the inputs of modulo-2 adder 166; and the output of modulo-2 adder 165 is connected to the input of modulo-2 adder 167. The outputs of modulo-2 adders 166 and 167 are connected to the inputs of modulo-2 adder 168, whose output is presented on line 142.

Figure 7:
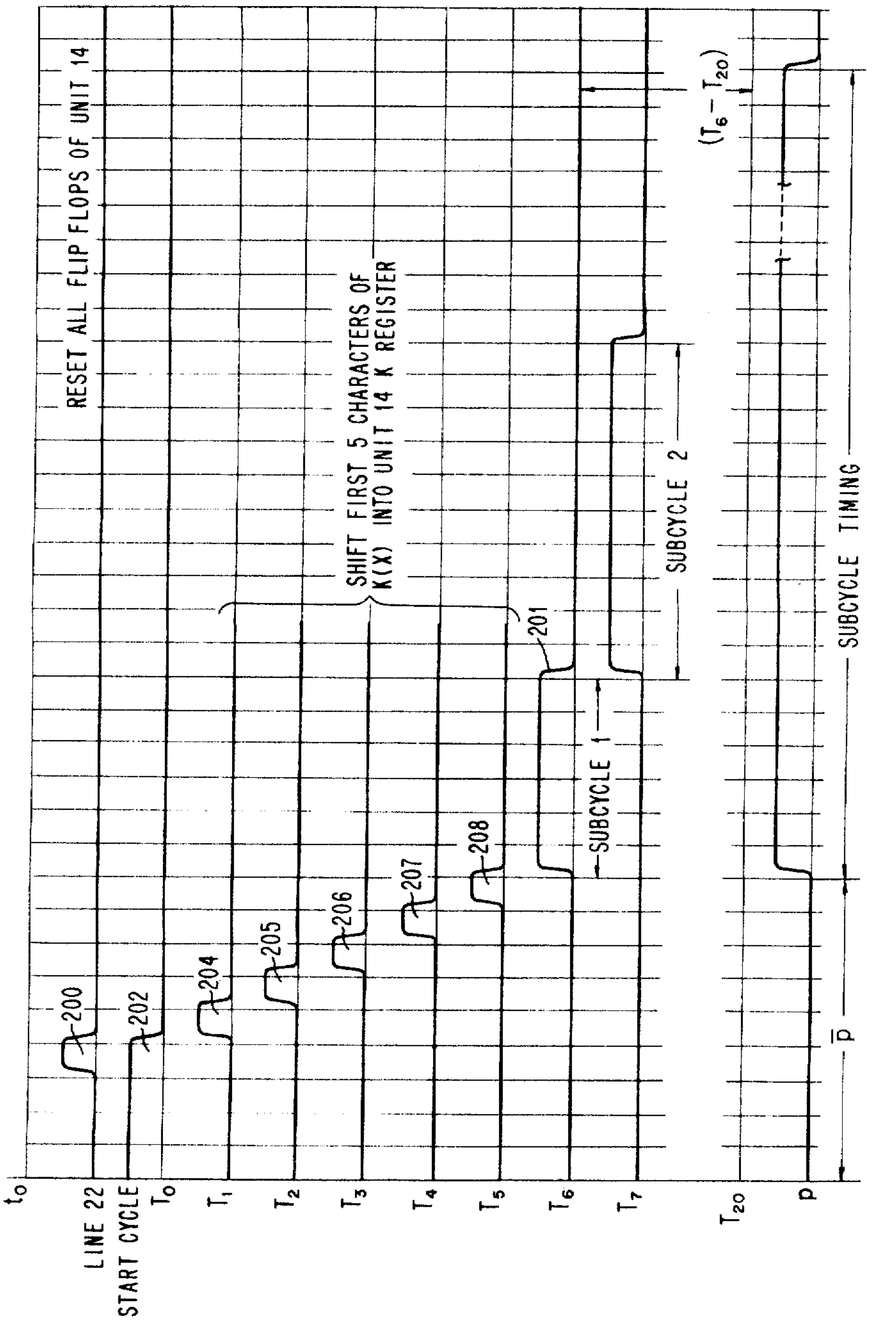
FIGURE 7 is a timing diagram for the embodiment of FIGURE 1.

FIG. 7 is a timing diagram for the operation of embodiment 10 presented in FIG. 1. The flip-flops of storage cells 20–1 to 20–5, e.g., flip-flops 118–1 to 118–6 (FIG. 3) are first reset by a pulse 200 on line 122. A start cycle pulse 202 in time period $T_0$ establishes the timing for the shift of Galois field elements $k_{29}$, $k_{28}$, . . . $k_0$ into transformation unit 14. Timing pulses 204 to 208 in time periods $T_1$ to $T_5$, respectively, establish elements $k_{25}$ to $k_{29}$ in storage cells 20–1 to 20–5, respectively. During sub-cycle 1, in time period $T_6$, these elements are shifted one position in storage cells 20–1 to 20–5; i.e., the element $k_{24}$ is established in storage cell 20–1 and element $k_{29}$ in storage cell 20–5 is presented via cable 38 to multiplier 40. The $k_{29}$ value and the $b$ values are multiplied in multiplier units 40–1 to 40–5, respectively, and the outputs are presented to modulo-2 adder units 32–1 to 32–5 in time period $T_6$. Sub-cycle 2 occurs in time period $T_7$. In sub-cycle $T_7$, the contents of storage cell 20–5 is presented on cable 38 to multiplier 40 and $k_{23}$ is introduced to unit 14 on cable 18–1 from register 12. The element $k_{23}$ is combined in modulo-2 adder 32–1 with the output from multiplier unit 40–1. The content of storage cells 20–1 to 20–4 are transferred to modulo-2 adder 32–2 to 32–5 respectively, where they are combined with the outputs of multiplier units 40–2 to 40–5, respectively. The remaining sub-cycles occur in time periods $T_8$ to $T_{20}$. In time period $T_{20}$, $k_0$ is presented to modulo-2 adder 32–1. At the completion of the total sub-cycle timing $p$, which coincides with the end of sub-cycle $T_{20}$, the component elements of the address A, i.e., $a_0$ to $a_4$, for memory 16 corresponding to the key K are present in storage cells 20–1 to 20–5, respectively, and are applied to memory 16 via cables 26–1 to 26–5, respectively. Memory 16 is enabled to be addressed by a pulse on line 15–3 from counter and delay unit 15–2. Counter and delay unit 15–2 is connected by line 15–1 to cell 12–30 of register 12. When counter and delay circuit 15–2 establishes a count-down of 30 steps, indicatinng that the entire key in register 12 has been introduced to transformation unit 14, the built-in delay of unit 15–2 provides the time interval required for the address A to appear in storage cells 20–1 to 20–5 after $k_0$ has been introduced to unit 14. The information addressed in memory 16 is transferred externally of embodiment 10 via cable 44.

Therefore, the transformation implemented in FIG. 1 performs the division operation $$\frac{K(X)}{G(X)}=Q(X)+A(X)/G(X)$$

where $$K(X)=K_{29}X^{29}+k_{28}X^{28}+\ \dots\ k_1X+k_0,$$
$$G(X)=X^5+g_4X^4+g_3X^3+g_2X^2+g_1X^1+g_0.$$

The division operation provides $$Q(X)=q_{24}X^{24}+q_{23}X^{23}+\ \dots\ q_1X+q_0,$$
$$A(X)=a_4X^4+a_3X^3+\ \dots\ a_1X+a_0.$$

As a result of the division operation, a key $$K=k_{29}k_{28}\ \dots\ k_0$$

established in shift register 12 is transformed to the respective address $$A=a_4a_3\ \dots\ a_0$$

The design of the embodiment of FIG. 1 is such that keys with a distance 5 of each other in terms of Galois field elements provide different addresses in memory 16.

Figure 8:
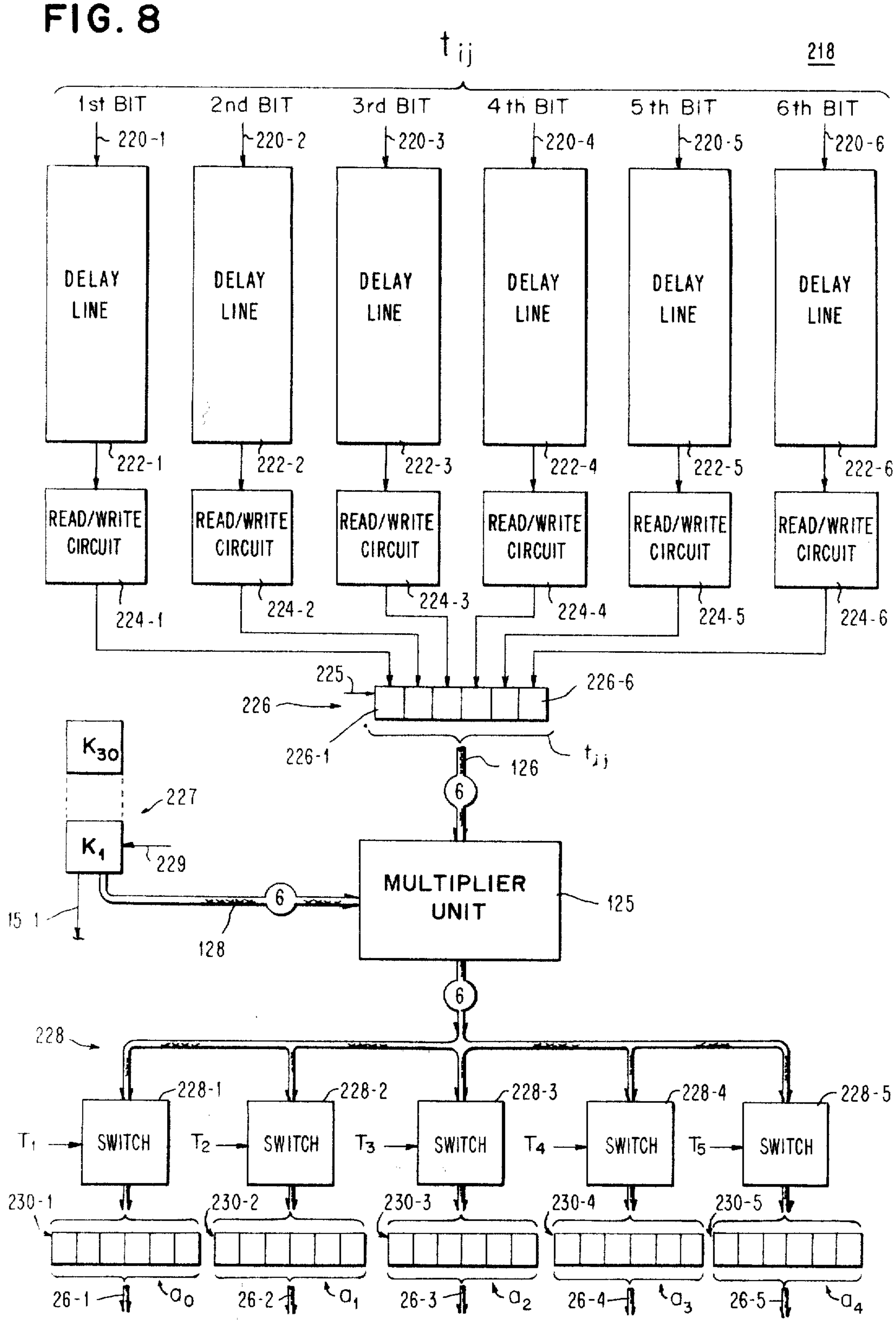
FIGURE 8 is another embodiment of the invention implementing a key to address transformation by multiplying a key by a matrix in a Galois field.

A second embodiment 218 of this invention presented in FIG. 8 obtains an address A from a key K by use of the general multiplier unit 125 of FIG. 4, and implements the transformation described hereinbefore $$a_i=\sum_{j=1}^{n}t_{ij}k_j$$

($i$=1, 2, . . . $n$). The six bits of each field element (Table I) corresponding to a $t_{ij}$ (Table II) is introduced to the input lines 220–1 to 220–6 of delay lines 222–1 to 222–6. The $[t_{ij}]$ of Table II are stored externally of the embodiment in means, not shown. Since the matrix $t_{ij}$ has $m$=5 rows and $n$=30 columns, each delay line 222–1 to 222–2 has bit storage of 150 bits. The bits are applied from delay lines 222–1 to 222–6 via read-write circuits 224–1 to 224–6 to cells 226–1 to 226–6, respectively, of storage register 226. Thus, delay line 222–1 to 222–6 and read-write circuits 224–1 to 224–6 are a buffer for the $[t_{ij}]$ elements established on cable 220. The $t_{ij}$ element is applied to cable 126 and the corresponding $k_j$ element of key K is applied to cable 128 from shift register 227 in the appropriate sequence. The sum $$a_i=\sum_{j=1}^{n}t_{ij}k_j$$

($j$=1, 2, . . . $n$-$k$), is accumulated in an accumulator 230 and the six bits of each of the components $a_0$, $a_1$, . . . $a_5$ are established in accumulators 230–1 to 230–5, respectively.

Figure 9:
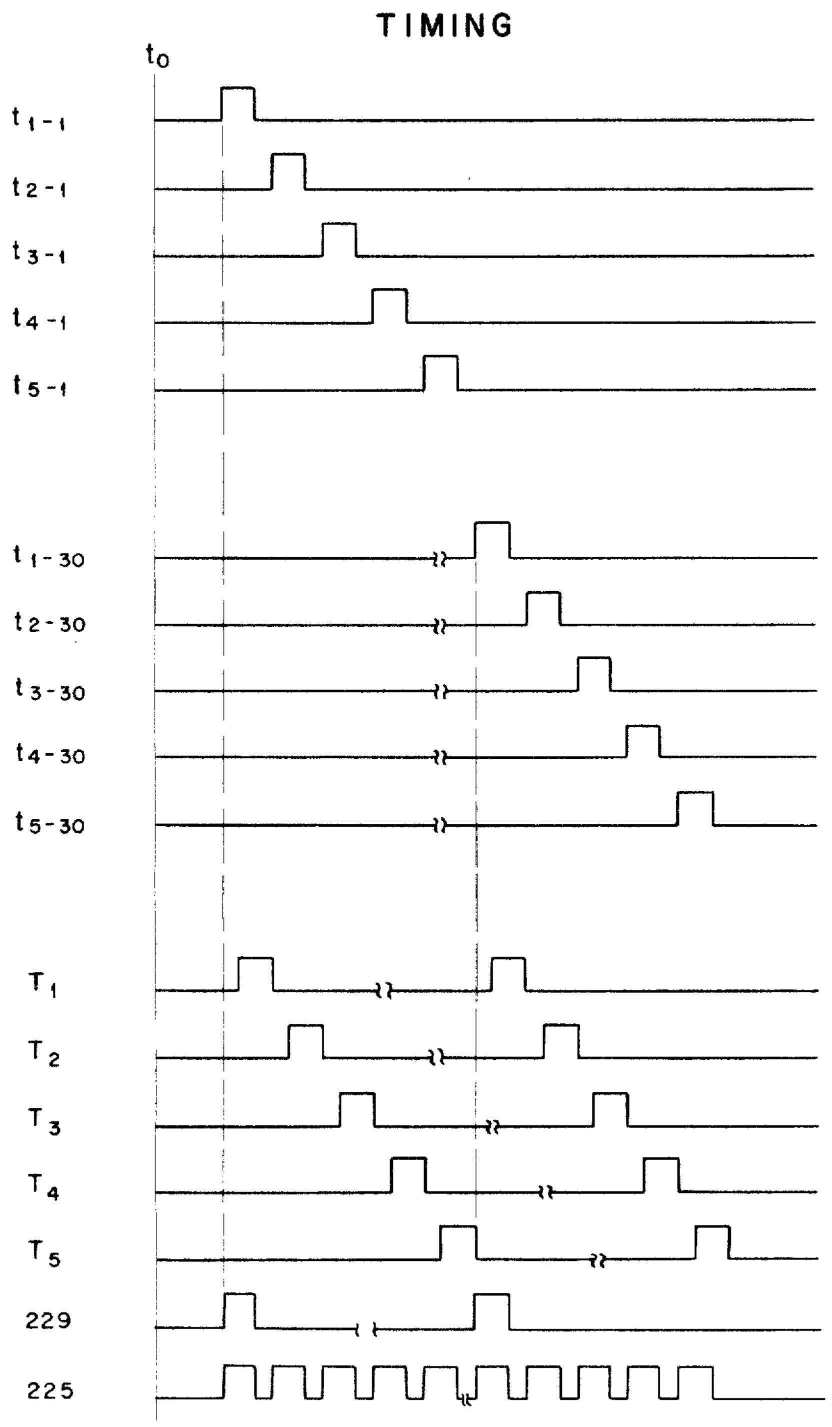
FIGURE 9 is a timing diagram for the embodiment of FIGURE 8.

The timing of the embodiment presented in FIG. 8 will be described with reference to FIG. 9. The pulses are labeled in accordance with the respective element of the $t_{ij}$ matrix which is introduced to delay lines 222–1 to 222–6, e.g., $t_{1\text{-}1}$, $t_{2\text{-}1}$, $t_{3\text{-}1}$, $t_{4\text{-}1}$, $t_{5\text{-}1}$, respectively.

The $t_{ij}$ are applied to multiplier unit 125 via register 226 by timing pulse on line 225, in the sequence:

$$t_{1-1},\ t_{2-1},\ t_{3-1},\ t_{4-1},\ t_{5-1},\ t_{1-2}\ \dots$$
$$t_{1-30},\ t_{2-30},\ t_{3-30},\ t_{4-30},\ t_{5-30}$$

The appropriate $t_{ij}$ are used to multiply an incoming element $k_j$ of a key appearing on cable 128 by means of multiplier unit 125. Illustratively, the first 5 coefficients $t_{1-1}$, . . . $t_{5-1}$ are used to multiply the first component $k_1$ of the incoming key and the 5 successive results are sequentially gated by switch units 228–1 through 228–5, in time periods $T_1$ to $T_5$, to accumulators 230–1 to 230–5, respectively. The respective 6-bit input to the accumulators 230–1 through 230–5 is added modulo-2 to the contents therein and the resultant sums are left in the accumulators. Each 6-bit component $k_j$ of the incoming key in register 227 is fed into multiplier 125 by a pulse on line 229 and held thereat for the interval $T_1$ through $T_5$. The timing pulses on line 229 occur once for every fifth timing pulse applied to line 225 of register 226. When all the products provided by multiplier 125 have been appropriately accumulated in accumulators 230–1 to 230–5, the components $a_0$ to $a_5$ of the address A corresponding to the key K are present therein.

Corresponding to the situation described hereinabove with regard to embodiment 10 of FIG. 1, the address A is applied to a memory 16 from accumulators 230–1 to 230–5 via cable 26–1 to 26–5, respectively. The memory 16 is enabled to be addressed by a pulse 229 on line 15–1 to a counter and delay unit 15–2 which is set for a count down of 30 steps. In this circumstance, the delay of unit 15–2 is sufficient to allow time for the processing of the last 5 $t_{ij}$'s in multiplier 125 and the final accumulation in accumulator 230.

While the invention has been particularly shown and described with reference to preferred embodiments thereof, it will be understood by those skilled in the art that various changes in form and details may be made therein without departing from the spirit and scope of the invention.

What is claimed is:

1. Key to address transformation apparatus which provides different addresses for different keys satisfying given Hamming distance requirements comprising:

means for providing said keys, said keys being representable as code words of an algebraic code;

means for generating an address in accordance with a generator of said algebraic code by operating on one of said keys represented as a code word of said algebraic code to map said keys satisfying said Hamming distance requirements onto different addresses;

means for applying said key to said generating means;

a memory; and means for applying said generated address to said memory.

2. Key to address transformation apparatus which provides different addresses for different keys which are within a given Hamming distance of each other, comprising:

means for providing said keys, said keys being representable as code words of an algebraic code;

means for generating an address in accordance with a generator of said algebraic code by operating on one of said keys represented as a code word of said algebraic code to map said keys which are within a given Hamming distance of each other onto different addresses;

means for applying said key to said generating means;

a memory; and means for applying said generated address to said memory.

3. Key to address transformation apparatus which provides different addresses for different keys which are within a given Hamming distance of each other comprising:

means for providing said keys, said keys being representable as polynomials of an algebraic code;

means for generating an address in accordance with a generator of said algebraic code by dividing one of said keys, said key being represented as a polynomial, by a generator polynomial of said algebraic code to map said keys which are within a given Hamming distance of each other onto different addresses;

means for applying said key polynomial to said generating means;

means for applying said generator polynomial to said generating means;

a memory; and means for applying said generated address to said memory.

4. Key to address transformation apparatus which provides different addresses for different keys which are within a given Hamming distance of each other comprising:

means for providing said keys, said keys being representable as polynomials of an algebraic code;

means for generating an address in accordance with a generator of said algebraic code by dividing one of said keys, said key being represented as a polynomial, by a generator polynomial of said algebraic code to map said keys which are within a given Hamming distance of each onto different addresses, said generator polynomial being stored in said generating means;

a memory; and means for applying said generated address to said memory.

5. Key to address transformation apparatus which provides different addresses for different keys which are within a given Hamming distance of each other comprising:

means for providing said keys, said keys being representable as vectors of a vector space;

means for generating an address in accordance with a generator vector of said vector space by multiplying one of said keys, said key being represented as a vector, by a transformation matrix derived from said vector space to map said keys which are within a given Hamming distance of each other onto different addresses;

means for applying said key vector to said generating means;

means for applying said transformation matrix to said generating means;

a memory; and means for applying said generated address to said memory.

6. Key to address transformation apparatus which provides different addresses for different keys which are within a given Hamming distance of each other, comprising:

means for providing said keys, said keys being representable as polynomials of an algebraic code;

means for generating an address in accordance with a generator polynomial G(X) of said algebraic code by dividing one of said keys, being represented as a polynomial K(X), by said generator polynomial G(X) to map said keys which are within a given Hamming distance of each other onto different addresses, the components of said key, generator and address being Galois field elements;

means for applying said key polynomial to said generating means;

means for applying said generator polynomial to said generating means;

a memory; and means for applying said generated address to said memory.

7. Key to address transformation apparatus which provides different addresses for different keys which are within a given Hamming distance of each other, comprising:

means for providing said keys, said keys being representable as polynomials of an algebraic code;

means for generating an address in accordance with a generator polynomial G(X) of said algebraic code by dividing one of said keys represented as a polynomial K(X) by said generator polynomial G(X) of said algebraic code to map said keys which are within a given Hamming distance of each other onto different addresses, the components of said key, generator and address being Galois field elements; said generator polynomial being stored in said generating means;

means for applying said key to said generating means;

a memory; and means for applying said generated address to said memory.

8. Key to address transformation apparatus which provides different addresses for different keys which are within a given Hamming distance of each other, comprising:

means for providing said keys, said keys being representable as polynomials G(X) of an algebraic code;

means for generating an address in accordance with a generator polynomial of said algebraic code by dividing one of said keys, said key being represented as a polynomial K(X), by said generator polynomial G(X) of said algebraic code to map said keys which are within a given Hamming distance of each other onto different addresses, the components of said key, generator and address being Galois field elements, said generator polynomial being stored in said generating means, said generating means including shift register means for developing said address in storage cells thereof, and multiplier means for obtaining the product of two Galois field elements;

means for applying said key polynomial to said generating means;

a memory; and means for applying said generated address to said memory.

9. Apparatus for transforming a set of keys to a set of addresses which provides different addresses for different keys satisfying given Hamming distance requirements comprising:

means for introducing said keys to said apparatus, each of said keys being representable by a plurality of symbols;

a memory;

means for generating in accordance with a transformation matrix derived from an algebraic code different addresses in said memory for said keys by utilizing said transformation matrix to map said keys satisfying said distance requirements onto different addresses, said matrix having certain sets of linearly independent column vectors, said keys having corresponding identical symbols in the positions corresponding to said column vectors; and means for applying said generated address to said memory.

10. Apparatus for transforming a set of keys to a set of addresses comprising:

means for introducing said keys to said apparatus, said keys being representable as $n$-tuples;

a memory;

means for generating in accordance with a transformation matrix derived from an algebraic code different addresses for said memory for different keys which are within a given Hamming distance of each other by utilizing said matrix transformation, said keys being represented as $n$-tuples $(k_1, k_2, \ldots k_n)$ of symbols from an alphabet containing $2^q$ letters, where $q$ is the number of bits per symbol and said addresses being represented as $m$-tuples $(a_1, \ldots, a_m)$ of symbols from the same alphabet, to map according to the matrix transformation $$a_i = \sum_{j=1}^{n} t_{ij} k_j$$

$(i=1, \ldots m)$, said keys within a given Hamming distance D of each other onto different addresses in the file memory, where $[t_{ij}]$ is a matrix with $m$ rows and $n$ columns, and where the $a_i$, $t_{ij}$ and $k_j$ are considered as elements of a Galois field and the sum and product are evaluated as the operations of the field; and means for applying said generated addresses to said memory.

11. Apparatus for transforming a set of keys to a set of addresses comprising:

means for introducing said keys to said apparatus, said keys being representable as polynomials of an algebraic code;

a memory;

means for generating in accordance with a generator polynomial G(X) of said algebraic code different addresses in said memory for different keys which are within a given Hamming distance of each other by utilizing said generator polynomial G(X) of said algebraic code, said keys being represented as polynomials K(X) of degree $(n-1)$ whose coefficients are symbols from an alphabet containing $2^q$ letters, where $q$ is the number of bits per symbol and said addresses being represented as polynomials A(X) of degree $(m-1)$ whose coefficients are symbols from the same alphabet, and to map according to transformation $$A(X) = K(X) - Q(X)G(X)$$

said keys within a given Hamming distance D of each other onto different addresses in the memory, where A(X) is the remainder of the division of K(X) by G(X) and Q(X) is the quotient; and means for applying said generated addresses to said memory.

12. Key to address transformation apparatus which provides different addresses for different keys which are within a given Hamming distance of each other comprising:

means for providing said keys, said keys being representable as vectors;

means for generating in accordance with a transformation matrix $[t_{ij}]$ derived from an algebraic code an address $a_1 \ldots a_m$ by multiplying one of said keys $k_1, \ldots k_n$, said key being represented as a vector, by said transformation matrix $[t_{ij}]$ derived from said algebraic code, to map said keys which are within a given distance of each other onto different addresses, the components of said key address and matrix being Galois field elements, said generating means including a multiplier unit for providing the sums $$a_i = \sum_{j=1}^{n} t_{ij} k_j$$

$(i=1, \ldots m)$;

means for applying said key to said generating means;

a memory; and means for applying said generated address to said memory.

References Cited by the Examiner

UNITED STATES PATENTS

| | | | |
|---|---|---|---|
| 3,036,773 | 5/1962 | Brown | 235—157 |
| 3,089,125 | 5/1963 | Reynolds | 340—172.5 |
| 3,111,648 | 11/1963 | Marsh et al. | 340—172.5 |
| 3,202,971 | 8/1965 | Blaauw | 340—172.5 |

ROBERT C. BAILEY, *Primary Examiner.*

R. M. RICKERT, *Assistant Examiner.*